(12) United States Patent
Faulkner (10) Patent No.: US 8,318,353 B2
(45) Date of Patent: Nov. 27, 2012

(54) METHOD FOR MAKING ELECTRODE ACTIVE MATERIALS

(75) Inventor: Titus Faulkner, Las Vegas, NV (US)

(73) Assignee: Valence Technology, Inc., Las Vegas, NV (US)

( * ) Notice: Subject to any disclaimer, the term of this patent is extended or adjusted under 35 U.S.C. 154(b) by 202 days.

(21) Appl. No.: 12/845,869

(22) Filed: Jul. 29, 2010

(65) Prior Publication Data

US 2010/0303701 A1 Dec. 2, 2010

Related U.S. Application Data

(62) Division of application No. 11/379,754, filed on Apr. 21, 2006, now Pat. No. 7,790,319.

(51) Int. Cl.
*H01M 4/58* (2010.01)
*C01B 25/26* (2006.01)

(52) U.S. Cl. .............. 429/231.5; 429/231.95; 429/218.1; 423/306

(58) Field of Classification Search .. 429/231.1–231.95; 423/306
See application file for complete search history.

(56) References Cited

U.S. PATENT DOCUMENTS

2004/0229750 A1* 11/2004 Bortinger ............... 502/209
2005/0048371 A1* 3/2005 Nagayama et al. ......... 429/236

OTHER PUBLICATIONS

Gaubicher et al., "Li/B-VOPO4: A New 4 V System for Lithium Batteries", Journal of the Electrochemical Society, 1999, vol. 146, (12), pp. 4375-4379.*

Kerr, et al., "Highly Reversible Li Insertion at 4 V ε-VOPO4 α-LIVOPO4 Cathodes", Electrochemical and Solid State Letters, Oct. 2000, vol. 3, No. 10, pp. 460-462 (Abstract).
Gaubicher et al., "Li/β-VOPO4: A New 4 V System for Lithium Batteries", Journal of Electrochemical Society, 1999, vol. 146, (12), pp. 4375-4379.
Chauvel, et al., "Redox Intercalation of Alkali Metals Into Vanadyl Phosphate Dihydrate", Materials Chemistry and Physics 40, 1995, pp. 207-211.
Vitezslav, et al., "Intercalation of Alkali Metal Ions Into Layered VOPO4 .2H2O", Molecular Crystals and Liquid Crystals, Section A, 1994, vol. 244, pp. 121-126 (Abstract).
Zima et al., "Intercalation of VOPO4.2H2O With Lithium Ions", Solid State Ionics, Diffusion & Reactions, Jan. 1994, vol. 67 (3-4), pp. 277-280 (Abstract).
Pozas et al., "Lithium Insertion in Vanadyl Phosphate", Solid State Ionics 51 (1992) pp. 79-83.
Genkina et al., "Crystal Structure of Synthetic Tavorite LiFe[PO4](OH,F)" Kristallografiya (1984), 29(1) 50-5. (Abstract).
Chauvel et al., "Spectroscopic Study of VOPO4, 2H2O Intercalation Compounds", Materials Science Forum, 1992, vols. 91-93, pp. 351-356.

(Continued)

*Primary Examiner* — Karie O'Neill Apicella
(74) *Attorney, Agent, or Firm* — Cynthia S. Kovacevic; Brian T. Mangum; Roger A. Williams

(57) ABSTRACT

The present invention is directed to a method for making electrode active materials represented by the general formula:

$$A_a(VO)_b XO_4,$$

wherein:
(a) A is an alkali metal or mixture of alkali metals, and $0<a<4$;
(b) $0<b<2$;
(c) X is selected from the group consisting of phosphorous (P), sulfur (S), arsenic (As), silicon (Si), and combinations thereof; and
wherein A, X, a and b are selected to maintain the electroneutrality of the electrode active material in its nascent (as prepared or synthesized) state.

9 Claims, 6 Drawing Sheets

OTHER PUBLICATIONS

Jacobson et al., "Redox Intercalation Reactions of VOPO4•2H2O with Mono- and Divalent Cations", Inorganic Chemistry, 1985, 24(12), pp. 1782-1787.

Chavel et at., "Spectroscopic Study of VOPO4,2H2O Intercalation Compounds", Material Resource Bulletin, 1991, 26(6), pp. 487-497.

Dupre et al., "Electrochemical Performance of Different Li-VOPO4 Systems", 2001, Journal of Power Sources, vol. 97-98, pp. 532-534.

Lii et al., "Synthesis and Structural Characterization of Sodium Vanadyl (IV) Orthophosphate NaVOPO4", 1991 Institute of Kristallographic, vol. 197, pp. 67-73.

Lii, Kwang-Hwa, "Structural Chemistry of A(VOPO4)2•nH2O (A=Alkali, Alkaline-Earth, and Transition Metals)", 1992, Journal of Chinese Chemical Society, vol. 39, pp. 569-576.

International Search Report PCT/US07/67051 dated Jun. 20, 2008.

* cited by examiner

METHOD FOR MAKING ELECTRODE ACTIVE MATERIALS

This application claims priority from and is a divisional application of U.S. application Ser. No. 11/379,754, filed Apr. 21, 2006, now allowed.

FIELD OF THE INVENTION

This invention relates to a novel method for synthesizing electrode active materials for use in secondary electrochemical cells.

BACKGROUND OF THE INVENTION

A battery pack consists of one or more secondary (rechargeable) electrochemical cells or batteries, wherein each cell typically includes a positive electrode, a negative electrode, and an electrolyte or other material for facilitating movement of ionic charge carriers between the negative electrode and positive electrode. As the cell is charged, cations migrate from the positive electrode to the electrolyte and, concurrently, from the electrolyte to the negative electrode. During discharge, cations migrate from the negative electrode to the electrolyte and, concurrently, from the electrolyte to the positive electrode.

Compounds of the formula $VOXO_4$ (X=S, P or As) are known to be suitable for use as electrode active materials in lithium anode-based secondary electrochemical cells (Li// $VOXO_4$). However, these materials must be lithiated in order to make these materials useful in a lithium-ion cell (e.g. a cell containing a graphitic negative electrode). Lithiation of these electrode active materials can be accomplished chemically using lithiating agents such as butyl lithium and lithium iodide. However, such chemical lithiation techniques are expensive, slow and produce low yields, therefore making them unsuitable for commercial use.

Accordingly, there is a current need for a method of making compounds of the formula $AVOXO_4$ (A=an alkali metal, and X=S, P or As), which is easier, faster, less expensive and/or produces greater yields, than those methods known in the art.

SUMMARY OF THE INVENTION

The present invention is directed to a novel method for making electrode active materials represented by the general formula:

$$A_a(VO)_b XO_4,$$

wherein:
(a) A is an alkali metal or mixture of alkali metals and $0<a<4$;
(b) $0<b<2$;
(c) X is selected from the group consisting of phosphorous (P), sulfur (S), arsenic (As), silicon (Si), and combinations thereof; and
(d) A, X, a and b are selected to maintain the electroneutrality of the electrode active material in its nascent (as prepared) state;

wherein the method includes the step of precipitating the compound from an aqueous solution containing vanadyl ions ($VO^{2+}$), alkali metal ions and ions of moiety $XO_4$.

DETAILED DESCRIPTION OF THE PREFERRED EMBODIMENTS

It has been found that the novel methods of this invention affords benefits over such methods among those known in the art. Such benefits include, without limitation, one or more of ease of manufacture, greater yields, faster reaction times, and reduced costs. Specific benefits and embodiments of the present invention are apparent from the detailed description set forth herein below. It should be understood, however, that the detailed description and specific examples, while indicating embodiments among those preferred, are intended for purposes of illustration only and are not intended to limit the scope of the invention.

The present invention is directed to a method for making electrode active materials represented by the general formula (I):

$$A_a(VO)_b XO_4, \qquad (I)$$

wherein:
(a) A is an alkali metal or mixture of alkali metals, and $0<a<4$;
(b) $0<b<2$;
(c) X is selected from the group consisting of phosphorous (P), sulfur (S), arsenic (As), silicon (Si), and combinations thereof; and wherein A, X, a and b are selected to maintain the electroneutrality of the electrode active material in its nascent (as prepared or synthesized) state.

Unless otherwise specified, a variable described herein algebraically as equal to ("="), less than or equal to ("≦"), or greater than or equal to ("≧") a number is intended to subsume values or ranges of values about equal or functionally equivalent to said number.

As referred to herein "electroneutrality" is the state of the electrode active material wherein the sum of the positively charged species (e.g., A and moiety (VO)) in the material is equal to the sum of the negatively charged species (e.g., $XO_4$) in the material. Preferably, the $XO_4$ moiety is an anion having a charge of −2, −3, or −4, depending on the selection of X. Upon the selection of X for moiety $XO_4$, selection of the values for variables a (moiety A) and b (moiety (VO)) are governed by the formula (A):

$$a+2b=V^{XO4}, \qquad (A)$$

wherein $V^{XO4}$ is the oxidation state for moiety $XO_4$.

Electrode active materials represent by general formula (I), made by the methods described herein, are characterized has having $VOXO_4$ host layers composed of corner-sharing $VO_6$ octahedra and $XO_4$ tetrahedra, intercalated with guest species (A) between the host layers.

For all embodiments described herein, A is selected from the group consisting of lithium (Li), sodium (Na), potassium (K), and mixtures thereof. In one subembodiment, A is selected from the group consisting of Li, a mixture of Li with Na, a mixture of Li with K, and a mixture of Li, Na and K. In another subembodiment, A is Li. In another subembodiment, A is Na. For all embodiments herein, $0 < a < 4$. In one subembodiment, $0 < a \leq 2$. In one subembodiment, $a=1$. In another subembodiment, $a=2$.

For all embodiments described herein, $0 < b < 2$. In one subembodiment, $0 < b \leq 1$. In another subembodiment, $0 < b \leq 0.5$. In another subembodiment, $b=1$.

For all embodiments described herein, X is selected from the group consisting of phosphorous (P), sulfur (S), arsenic (As), silicon (Si), and combinations thereof. In one subembodiment, X is P. In another subembodiment, X is selected from the group consisting of Si, P, and mixtures thereof. In another subembodiment, $X=(Si_{1-x}, P_x)$, wherein $0 < x < 1$.

As used herein, the recitation of a genus of elements, materials or other components, from which an individual component or mixture of components can be selected, is intended to include all possible sub-generic combinations of the listed components, and mixtures thereof.

Electrode active materials represent by general formula (I) are prepared by precipitating the electrode active material from an aqueous solution containing vanadyl ions ($VO^{2+}$), alkali metal ions and ions of moiety $XO_4$.

In one embodiment, the electrode active materials represent by general formula (I) are prepared by first preparing an aqueous solution containing one or more ion species selected from the group consisting of vanadyl ions, alkali metal ions and ions of moiety $XO_4$. The aqueous solution is prepared by dissolving one or more vanadyl precursor compounds, one or more alkali metal precursor compounds, and/or one or more precursor compounds containing moiety $XO_4$, in an aqueous solvent. In one embodiment, one or more alkali metal precursor compounds and the one or more precursor compounds containing moiety $XO_4$, are the same. Stated differently, the alkali metal ions and moiety $XO_4$ derive from the same compound. In another embodiment, the alkali metal ions are present in solution with either the vanadyl ions or the ions of moiety $XO_4$, wherein the third ion species is then added and the electrode active material is formed by precipitation.

The precursor compounds can be dissolved separately and then combined to form a single aqueous solution, dissolved simultaneously in one step (single step dissolution reaction), or dissolved using a step-wise dissolution reaction (e.g. by dissolving the first precursor in an aqueous solution, followed by the addition and dissolution of the second, and so forth until all the requisite precursors have been dissolved and the precipitant material forms).

During the precipitation step, the aqueous solution is acidic to assist in complete dissolution of the vanadyl ions. In one subembodiment, $pH \leq 5$ at standard temperature and pressure or "STP" (0° C. and 1 atmosphere (atm) of absolute pressure). In one subembodiment, $pH \leq 4$ at STP. In another subembodiment, $0 \leq pH \leq 5$ at STP. In another subembodiment, $0 \leq pH \leq 4$ at STP. In yet another subembodiment, $2 \leq pH \leq 4$.

Vanadyl precursor compounds useful herein for preparing an aqueous solution containing vanadyl ions include $V_2O_5$, $V_2O_3$, $VOSO_4$, $VOC_2O_4$, and mixtures thereof. Alkalized forms of the aforementioned precursor compounds may also be used.

Alkali metal precursor compounds useful herein for preparing an aqueous solution containing alkali metal ions include AOH, $A_2CO_3$, $A_3C_6H_5O_7$, $ANO_3$, $CH_3AO$, Al, ACl, and mixtures thereof, wherein A is an alkali metal. Precursor compounds useful herein for preparing an aqueous solution containing alkali metal ions as well as one of the other two ion species include $A_2SO_4$, $A_4SiO_4$, $AH_2PO_4$, $A_3PO_4$, $HAsA_2O_4$, and mixtures thereof, wherein A is an alkali metal.

Precursor compounds containing moiety $XO_4$ which are useful herein for preparing an aqueous solution containing ions of moiety $XO_4$ include $H_3PO_4$, $H_2SO_4$, and mixtures thereof.

The precursor compounds selected preferably disassociate in the aqueous solution to produce counter-ions (e.g. $Cl^-$, $I^-$, and $SO_4^{2-}$) which do not compete with the precipitation of the electrode active material or form insoluble impurities which could otherwise become entrained within the electrode active material precipitant.

Where two of the three ions participating in the formation of the electrode active material tend to form other compounds and therefore compete with the precipitation of the electrode active material, steps should be taken to avoid formation of those other, unwanted compounds to ensure the electrode active material is substantially pure. For example, in one embodiment where alkali metal ions (e.g. $Li^+$) and phosphate ions ($PO_4^{3-}$) are present in solution, alkali metal phosphates (e.g. $A_3PO_4$) may form, typically when pH is greater than 5 at STP. Formation of $A_3PO_4$ can be substantially avoided by conducting the precipitation reaction in an acidic media buffered by an acidic buffer and/or by excess acidic precursor. Preferably, the acidic buffer yields ions that do not compete with or participate in, the precipitation reaction. Suitable buffers include HCl, $HNO_3$, $H_2O_2$, and combinations thereof.

If an aqueous solution containing one or two ion species selected from the group consisting of vanadyl ions, alkali metal ions and ions of moiety $XO_4$ is prepared, the remaining ion species are subsequently added (preferably after the pH has been adjusted, if necessary, in order to substantially avoid competing reactions). Thereafter, the solution is stirred and the active material precipitate is collected.

The present invention also provides a secondary electrochemical cell containing an electrode active material made by the method described herein. The present invention also provides for batteries containing the novel electrode active material described by general formulas (I), (IV) and (V), wherein the battery includes:

(a) a first electrode (also commonly referred to as a positive electrode or cathode) which includes an active material of the present invention;

(b) a second electrode (also commonly referred to as a negative electrode or anode) which is a counter-electrode to the first electrode; and (c) an electrolyte in ion-transfer communication with the first and second electrodes.

The electrode active material of this invention may be incorporated into the first electrode, the second electrode, or both. Preferably, the electrode active material is employed in the cathode. The architecture of a battery of the present invention is selected from the group consisting of cylindrical wound designs, wound prismatic and flat-plate prismatic designs, and polymer laminate designs.

Figure 1:
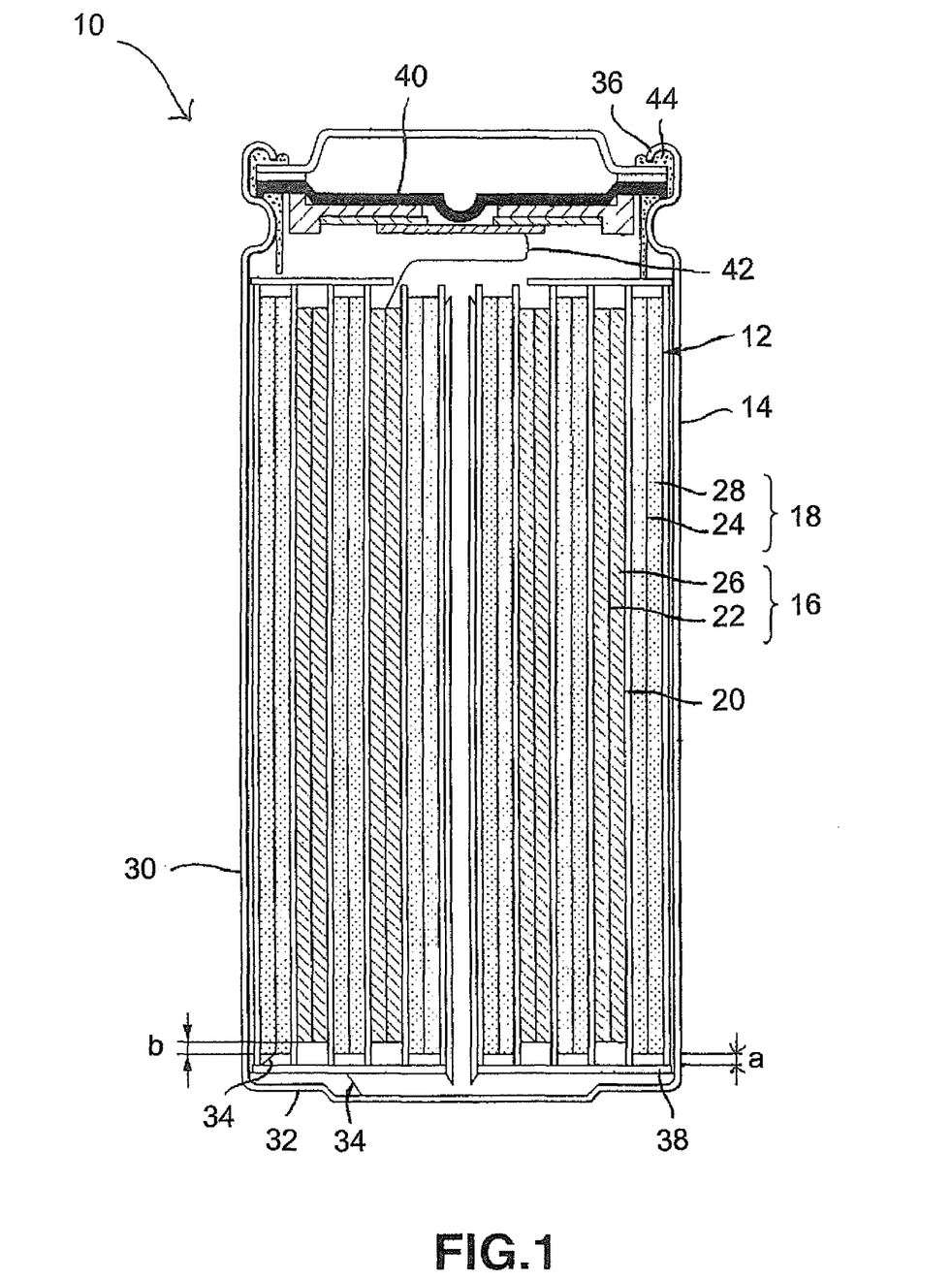
FIG. 1 is a schematic cross-sectional diagram illustrating the structure of a non-aqueous electrolyte cylindrical electrochemical cell of the present invention.

Referring to FIG. 1, in one embodiment, a novel secondary electrochemical cell 10 having an electrode active material of the present invention, includes a spirally coiled or wound electrode assembly 12 enclosed in a sealed container, preferably a rigid cylindrical casing 14 as illustrated in FIG. 1. In one subembodiment, the cell 10 is a prismatic-type cell, and the casing has a substantially rectangular cross-section (not illustrated).

Referring again to FIG. 1, the electrode assembly 12 includes: a positive electrode 16 consisting of, among other things, an electrode active material represented by general formula (I); a counter negative electrode 18; and a separator 20 interposed between the first and second electrodes 16,18. The separator 20 is preferably an electrically insulating, ionically conductive microporous film, and composed of a polymeric material selected from the group consisting of polyethylene, polyethylene oxide, polyacrylonitrile and polyvinylidene fluoride, polymethyl methacrylate, polysiloxane, copolymers thereof, and admixtures thereof.

Each electrode 16,18 includes a current collector 22 and 24, respectively, for providing electrical communication between the electrodes 16,18 and an external load. Each current collector 22,24 is a foil or grid of an electrically conductive metal such as iron, copper, aluminum, titanium, nickel, stainless steel, or the like, having a thickness of between 5 μm and 100 ||m, preferably 5 μm and 40 μm. Optionally, the current collector may be treated with an oxide-removing agent such as a mild acid and the like, and coated with an electrically conductive coating for inhibiting the formation of electrically insulating oxides on the surface of the current collector 22,24. Examples of a suitable coatings include polymeric materials comprising a homogenously dispersed electrically conductive material (e.g. carbon), such polymeric materials including: acrylics including acrylic acid and methacrylic acids and esters, including poly (ethylene-co-acrylic acid); vinylic materials including poly(vinyl acetate) and poly(vinylidene fluoride-co-hexafluoropropylene); polyesters including poly(adipic acid-co-ethylene glycol); polyurethanes; fluoroelastomers; and mixtures thereof.

The positive electrode 16 further includes a positive electrode film 26 formed on at least one side of the positive electrode current collector 22, preferably both sides of the positive electrode current collector 22, each film 26 having a thickness of between 5 μm and 150 μm, preferably between 25 μm an 125 μm, in order to realize the optimal capacity for the cell 10. The positive electrode film 26 is composed of between 80% and 95% by weight of an electrode active material represented by general formula (I), between 1% and 10% by weight binder, and between 1% and 10% by weight electrically conductive agent.

Suitable binders include: polyacrylic acid; carboxymethylcellulose; diacetylcellulose; hydroxypropylcellulose; polyethylene; polypropylene; ethylene-propylene-diene copolymer; polytetrafluoroethylene; polyvinylidene fluoride; styrene-butadiene rubber; tetrafluoroethylene-hexafluoropropylene copolymer; polyvinyl alcohol; polyvinyl chloride; polyvinyl pyrrolidone; tetrafluoroethylene-perfluoroalkylvinyl ether copolymer; vinylidene fluoride-hexafluoropropylene copolymer; vinylidene fluoride-chlorotrifluoroethylene copolymer; ethylenetetrafluoroethylene copolymer; polychlorotrifluoroethylene; vinylidene fluoride-pentafluoropropylene copolymer; propylene-tetrafluoroethylene copolymer; ethylene-chlorotrifluoroethylene copolymer; vinylidene fluoride-hexafluoropropylene-tetrafluoroethylene copolymer; vinylidene fluoride-perfluoromethylvinyl ether-tetrafluoroethylene copolymer; ethylene-acrylic acid copolymer; ethylene-methacrylic acid copolymer; ethylene-methyl acrylate copolymer; ethylene-methyl methacrylate copolymer; styrene-butadiene rubber; fluorinated rubber; polybutadiene; and admixtures thereof. Of these materials, most preferred are polyvinylidene fluoride and polytetrafluoroethylene.

Suitable electrically conductive agents include: natural graphite (e.g. flaky graphite, and the like); manufactured graphite; carbon blacks such as acetylene black, Ketjen black, channel black, furnace black, lamp black, thermal black, and the like; conductive fibers such as carbon fibers and metallic fibers; metal powders such as carbon fluoride, copper, nickel, and the like; and organic conductive materials such as polyphenylene derivatives.

The negative electrode 18 is formed of a negative electrode film 28 formed on at least one side of the negative electrode current collector 24, preferably both sides of the negative electrode current collector 24. The negative electrode film 28 is composed of between 80% and 95% of an intercalation material, between 2% and 10% by weight binder, and (optionally) between 1% and 10% by weight of an electrically conductive agent.

Intercalation materials suitable herein include: transition metal oxides, metal chalcogenides, carbons (e.g. graphite), and mixtures thereof. In one embodiment, the intercalation material is selected from the group consisting of crystalline graphite and amorphous graphite, and mixtures thereof, each such graphite having one or more of the following properties: a lattice interplane (002) d-value ($d_{(002)}$) obtained by X-ray diffraction of between 3.35 Å to 3.34 Å, inclusive (3.35 Å$\leq d_{(002)} \leq$3.34 Å), preferably 3.354 Å to 3.370 Å, inclusive (3.354 Å$\leq d_{(002)} \leq$3.370 Å; a crystallite size ($L_c$) in the c-axis direction obtained by X-ray diffraction of at least 200 Å, inclusive ($L_c \geq$200 Å), preferably between 200 Å and 1,000 Å, inclusive (200 Å$\leq L_c$ 1,000 Å); an average particle diameter ($P_d$) of between 1 μm to 30 μm, inclusive (1 μm$\leq P_d \leq$30 μm); a specific surface (SA) area of between 0.5 m$^2$/g to 50 m$^2$/g, inclusive (0.5 m$^2$/g$\leq$SA$\leq$50 m$^2$/g); and a true density (ρ) of between 1.9 g/cm$^3$ to 2.25 g/cm$^3$, inclusive (1.9 g/cm$^3 \leq \rho \leq$2.25 g/cm$^3$).

Referring again to FIG. 1, to ensure that the electrodes 16,18 do not come into electrical contact with one another, in the event the electrodes 16,18 become offset during the winding operation during manufacture, the separator 20 "overhangs" or extends a width "a" beyond each edge of the negative electrode 18. In one embodiment, 50 μm a 2,000 μm. To ensure alkali metal does not plate on the edges of the negative electrode 18 during charging, the negative electrode 18 "overhangs" or extends a width "b" beyond each edge of the positive electrode 16. In one embodiment, 50 μm b 2,000 μm.

The cylindrical casing 14 includes a cylindrical body member 30 having a closed end 32 in electrical communication with the negative electrode 18 via one or more negative electrode leads 34, and an open end defined by crimped edge 36. In operation, the cylindrical body member 30, and more particularly the closed end 32, is electrically conductive and provides electrical communication between the negative electrode 18 and an external load (not illustrated). An insulating member 38 is interposed between the spirally coiled or wound electrode assembly 12 and the closed end 32. The insulating member 38 may be provided with apertures (not illustrated) for pressure equalization and/or electrolyte permeation.

A positive terminal subassembly 40 in electrical communication with the positive electrode 16 via a positive electrode lead 42 provides electrical communication between the positive electrode 16 and the external load (not illustrated). Preferably, the positive terminal subassembly 40 is adapted to sever electrical communication between the positive electrode 16 and an external load/charging device in the event of an overcharge condition (e.g. by way of positive temperature coefficient (PTC) element), elevated temperature and/or in the event of excess gas generation within the cylindrical casing 14. Suitable positive terminal assemblies 40 are disclosed in U.S. Pat. No. 6,632,572 to Iwaizono, et al., issued Oct. 14, 2003; and U.S. Pat. No. 6,667,132 to Okochi, et al., issued Dec. 23, 2003. A gasket member 44 sealingly engages the upper portion of the cylindrical body member 30 to the positive terminal subassembly 40.

A non-aqueous electrolyte (not shown) is provided for transferring ionic charge carriers between the positive electrode 16 and the negative electrode 18 during charge and discharge of the electrochemical cell 10. The electrolyte includes a non-aqueous solvent and an alkali metal salt dissolved therein. Suitable solvents include: a cyclic carbonate such as ethylene carbonate, propylene carbonate, butylene carbonate or vinylene carbonate; a non-cyclic carbonate such as dimethyl carbonate, diethyl carbonate, ethyl methyl carbonate or dipropyl carbonate; an aliphatic carboxylic acid ester such as methyl formate, methyl acetate, methyl propionate or ethyl propionate; a .gamma.-lactone such as γ-butyrolactone; a non-cyclic ether such as 1,2-dimethoxyethane, 1,2-diethoxyethane or ethoxymethoxyethane; a cyclic ether such as tetrahydrofuran or 2-methyltetrahydrofuran; an organic aprotic solvent such as dimethylsulfoxide, 1,3-dioxolane, formamide, acetamide, dimethylformamide, dioxolane, acetonitrile, propylnitrile, nitromethane, ethyl monoglyme, phospheric acid triester, trimethoxymethane, a dioxolane derivative, sulfolane, methylsulfolane, 1,3-dimethyl-2-imidazolidinone, 3-methyl-2-oxazolidinone a propylene carbonate derivative, a tetrahydrofuran derivative, ethyl ether, 1,3-propanesultone, anisole, dimethylsulfoxide and N-methylpyrrolidone; and mixtures thereof. A mixture of a cyclic carbonate and a non-cyclic carbonate or a mixture of a cyclic carbonate, a non-cyclic carbonate and an aliphatic carboxylic acid ester, are preferred.

Suitable alkali metal salts include: $LiClO_4$; $LiBF_4$; $LiPF_6$; $LiAlCl_4$; $LiSbF_6$; LiSCN; LiCl; $LiCF_3SO_3$; $LiCF_3CO_2$; $Li(CF_3SO_2)_2$; $LiAsF_6$; $LiN(CF_3SO_2)_2$; $LiB_{10}Cl_{10}$; a lithium lower aliphatic carboxylate; LiCl; LiBr; LiI; a chloroboran of lithium; lithium tetraphenylborate; lithium imides; sodium and potassium analogues of the aforementioned lithium salts; and mixtures thereof. Preferably, the electrolyte contains at least $LiPF_6$.

Figure 2:
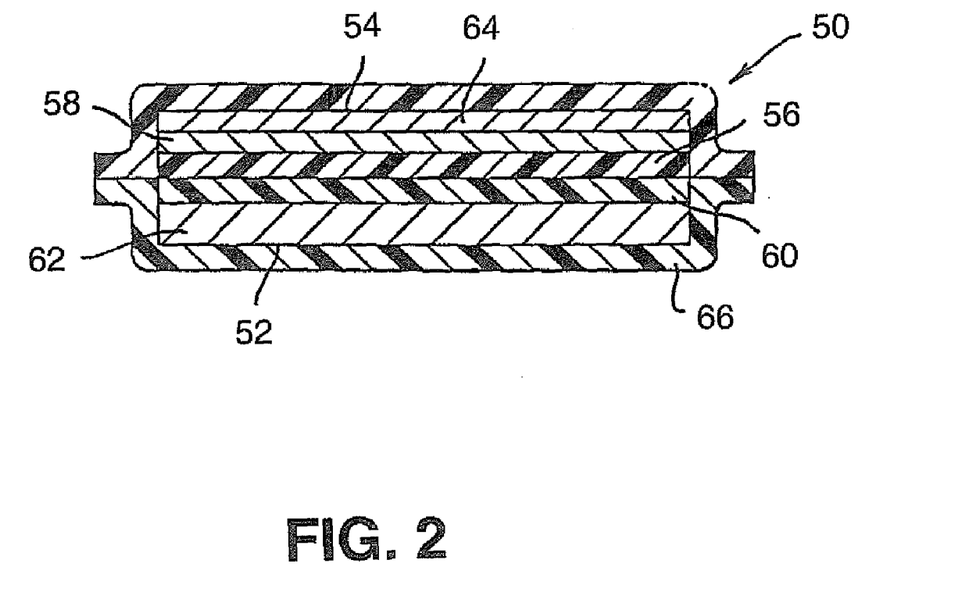
FIG. 2 is a schematic cross-sectional diagram illustrating the structure of another embodiment of an electrochemical cell of the present invention.

Referring to FIG. 2, in another embodiment, a polymer laminate-type secondary electrochemical cell 50 having an electrode active material represented by general formula (I), includes a laminated or polymer stacked cell structure, having a negative electrode 52, a positive electrode 54, and an electrolyte/separator 56 there between. The negative electrode 52 includes a current collector 60 (preferably, a copper foil or grid) in electrical communication with a negative electrode membrane or film 62; and the positive electrode 54 includes a current collector 58 (preferably, an aluminum foil or grid) in electrical communication with a positive electrode membrane or film 64. Protective bagging material 66 covers the cell and prevents infiltration of air and moisture. Such structures are disclosed in, for example, U.S. Pat. No. 4,925,752 to Fauteux et al; U.S. Pat. No. 5,011,501 to Shackle et al.; and U.S. Pat. No. 5,326,653 to Chang; all of which are incorporated by reference herein.

The relative weight proportions of the components of the positive electrode 54 are generally: about 50-90% by weight active material represented by general formula (I); 5-30% carbon black as the electric conductive diluent; and 3-20% binder chosen to hold all particulate materials in contact with one another without degrading ionic conductivity. Stated ranges are not critical, and the amount of active material in an electrode may range from 25-95 weight percent. The negative electrode 52 includes about 50-95% by weight of a preferred intercalation material, with the balance constituted by the binder. In a preferred embodiment, the negative electrode intercalation material is graphite. For test purposes, test cells are often fabricated using lithium metal electrodes.

Those skilled in the art will understand that any number of methods are used to form films from the casting solution using conventional meter bar or doctor blade apparatus. It is usually sufficient to air-dry the films at moderate temperature to yield self-supporting films of copolymer composition. Lamination of assembled cell structures is accomplished by conventional means by pressing between metal plates at a temperature of about 120-160° C. Subsequent to lamination, the battery cell material may be stored either with the retained plasticizer or as a dry sheet after extraction of the plasticizer with a selective low-boiling point solvent. The plasticizer extraction solvent is not critical, and methanol or ether are often used.

Separator membrane element 56 is generally polymeric and prepared from a composition comprising a copolymer. A preferred composition is the 75 to 92% vinylidene fluoride with 8 to 25% hexafluoropropylene copolymer (available commercially from Atochem North America as Kynar FLEX) and an organic solvent plasticizer. Such a copolymer composition is also preferred for the preparation of the electrode membrane elements, since subsequent laminate interface compatibility is ensured. The plasticizing solvent may be one of the various organic compounds commonly used as solvents for electrolyte salts, e.g., propylene carbonate or ethylene carbonate, as well as mixtures of these compounds. Higher-boiling plasticizer compounds such as dibutyl phthalate, dimethyl phthalate, diethyl phthalate, and tris butoxyethyl phosphate are particularly suitable. Inorganic filler adjuncts, such as fumed alumina or silanized fumed silica, may be used to enhance the physical strength and melt viscosity of a separator membrane and, in some compositions, to increase the subsequent level of electrolyte solution absorption.

Electrolyte solvents are selected to be used individually or in mixtures, and include dimethyl carbonate (DMC), diethylcarbonate (DEC), dipropylcarbonate (DPC), ethylmethylcarbonate (EMC), ethylene carbonate (EC), propylene carbonate (PC), butylene carbonate, lactones, esters, glymes, sulfoxides, sulfolanes, and mixtures thereof. The preferred solvents are EC/DMC, EC/DEC, EC/DPC and EC/EMC. The salt content ranges from 5% to 65% by weight, preferably from 8% to 35% by weight. One example is a mixture of EC:DMC:$LiPF_6$ in a weight ratio of about 60:30:10. Desirable solvents and salts are described in U.S. Pat. Nos. 5,643,695 to Barker et al. and 5,418,091 to Gozdz et al.

Examples of forming laminate and polymer stacked cells are disclosed in U.S. Pat. No. 4,668,595 to Yoshino et al.; U.S. Pat. No. 4,830,939 to Lee et al.; U.S. Pat. No. 4,935,317 to Fauteux et al.; U.S. Pat. No. 4,990,413 to Lee et al.; U.S. Pat. No. 4,792,504 to Schwab et al.; U.S. Pat. No. 5,037,712 to Shackle et al.; U.S. Pat. No. 5,262,253 to to Golovin; U.S. Pat. No. 5,300,373 to Shackle; U.S. Pat. No. 5,435,054 to Tonder et al.; U.S. Pat. No. 5,463,179 to Chalonger-Gill et al.; U.S. Pat. No. 5,399,447 to Chalonger-Gill et al.; U.S. Pat. No. 5,482,795 to Chalonger-Gill and U.S. Pat. No. 5,411,820 to Chalonger-Gill; each of which is incorporated herein by reference in its entirety. Note that the older generation of cells contained organic polymeric and inorganic electrolyte matrix materials, with the polymeric being most preferred. The polyethylene oxide of U.S. Pat. No. 5,411,820 is an example. More modern examples are the VdF:HFP polymeric matrix. Examples of casting, lamination and formation of cells using VdF:HFP are as described in U.S. Pat. No. 5,418,091 to Gozdz; U.S. Pat. No. 5,460,904 to Gozdz; U.S. Pat. No.

5,456,000 to Gozdz et al.; and U.S. Pat. No. 5,540,741 to Gozdz et al.; each of which is incorporated herein by reference in its entirety.

The following non-limiting examples illustrate the compositions and methods of the present invention.

Example 1

An electrode active material of formula LiVOPO$_4$, was made as follows. At room temperature, 4.438 g (0.5 moles) of V$_2$O$_3$ (commercially available from Stratcor) was added to 2 equivalents plus 10% of HCl to form a solution. Subsequently, 2 equivalents plus 10% of HNO$_3$ were slowly added to the solution, and the solution was diluted with water to 100 milliliters (mL) to yield a dark blue solution. 12.310 g (1 mole) of LiH$_2$PO$_4$ as a 20% solution in water was added to the diluted dark blue solution, followed by 3 equivalents of LiOH, yielding a solution having a pH of 4.5. The resulting solution was stirred at room temperature, yielding a dark green precipitate. Thereafter, the solution was boiled to concentrate the solution to about 100 mL. The concentrated solution was filtered and washed three times, each time with 150 mL of water, yielding a dark green cake. The cake was dehydrated at 250° C. in air for 1 hour, yielding 7.4 g of a dark green powder.

Figure 3:
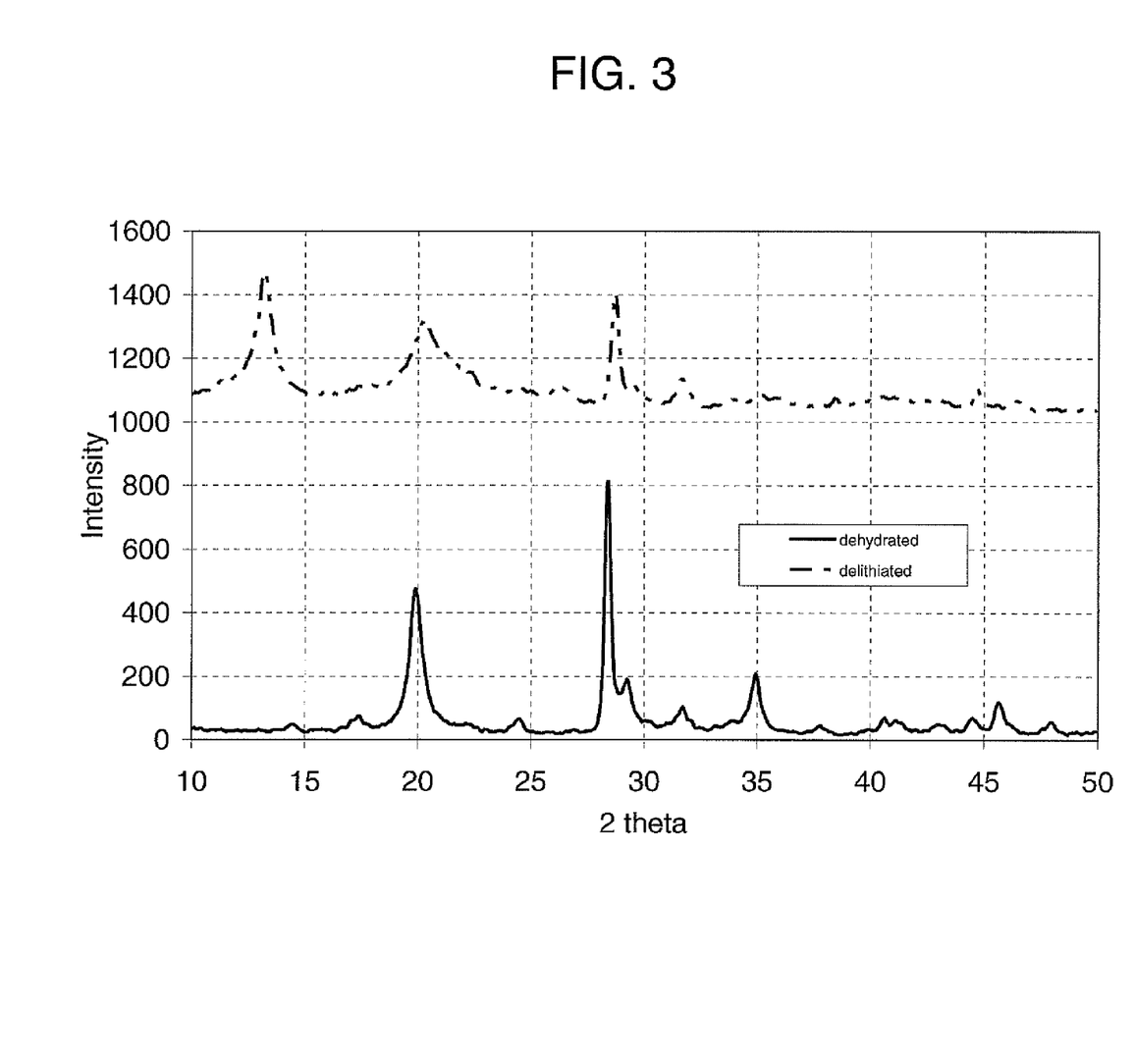
FIG. 3 shows the results of an x-ray powder diffraction analysis of a first sample of $LiVOPO_4$ prepared according to the invention, as well as an analysis of the electrochemically delithiated form of the first sample.

CuKα (λ=1.5405 Å) powder x-ray diffraction patterns were collected for the as-made dehydrated precipitate material and the electrochemically delithiated material. The pattern shown in FIG. 3 indicates the precipitate material to be α-LiVOPO$_4$, in fair agreement with the structural analysis for α-LiVOPO$_4$ described by Journal of Solid State Chemistry, vol. 177 (2004), pgs. 2896-2902. The pattern for the electrochemically delithiated material was not in agreement with α-VOPO$_4$; however, this is believed to be due to intercalation of solvent into the material.

Electrodes were formulated from a slurry with a weight ratio of 77:10:13 of active material synthesized per this Example:Super-P carbon:PVDF binder, respectively, which were mixed in a NMP-based slurry. The slurry was cast onto aluminum foil, dried to remove the solvent and cut to form an electrode coupon. A cell was assembled using the coupon as a cathode, lithium metal as the anode, LiPF$_6$ in 2:1 ethylene carbonate:dimethylene carbonate (EC:DMC) as the electrolyte and glass fiber as the separator.

Figure 4:
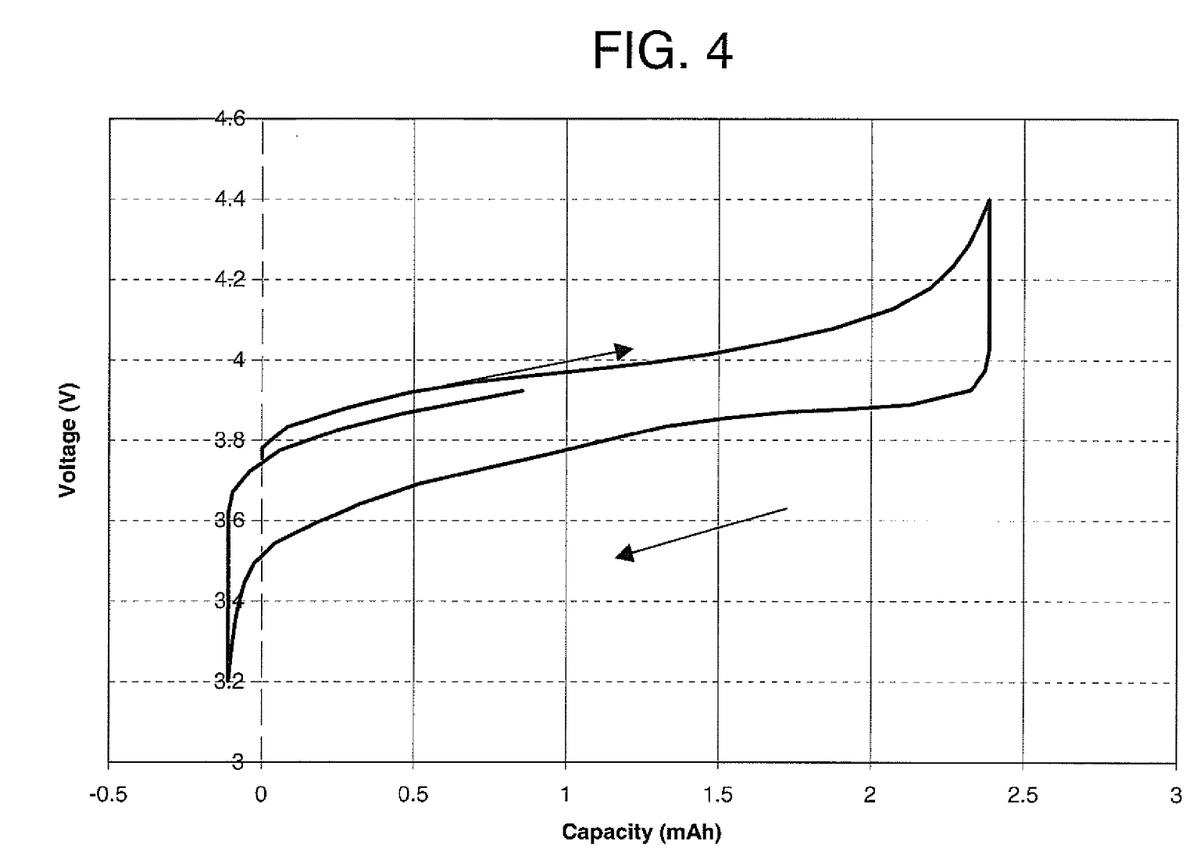
FIG. 4 is a plot of cathode specific capacity vs. cell voltage for a first $Li/1M\ LiPF_6\ (EC/DMC)/LiVOPO_4$ cell.

FIG. 4 shows the cell cycled at constant current between 3.2 V and 4.4 V for one and a half cycles at a C/12 rate. The voltage curves for the charge and discharge scans are similar in shape. The cell exhibited a discharge capacity of 77 mAh/g (milli-amp hours per gram), which was lower than expected and is believed to be due to the electrode formulation. After the final half cycle, the cathode coupon was removed from the cell in the fully charged state and the XRD pattern was scanned as previously described.

Example 2

An electrode active material of formula LiVOPO$_4$, was made substantially per the teachings of Example 1. At room temperature, 4.628 g (0.5 moles) of V$_2$O$_3$ (commercially available from Stratcor) was added to a mixture of 2 equivalents of HCl and 4 equivalents of HNO$_3$ to form a solution. 12.838 g of LiH$_2$PO$_4$ as a 30% solution in water was added to the solution. 20 mL of 30% H$_2$O$_2$ in water was slowly added, after which an aqueous solution of 8% LiOH monohydrate was added until the pH reached about 5.0. The resultant precipitate was then filtered and washed three times with 140 mL of water. The filter cake was then dried at 70° C. under partial vacuum for 15 minutes. The as-dried material was then dehydrated in air at 250° C. for 1 hour.

Figure 5:
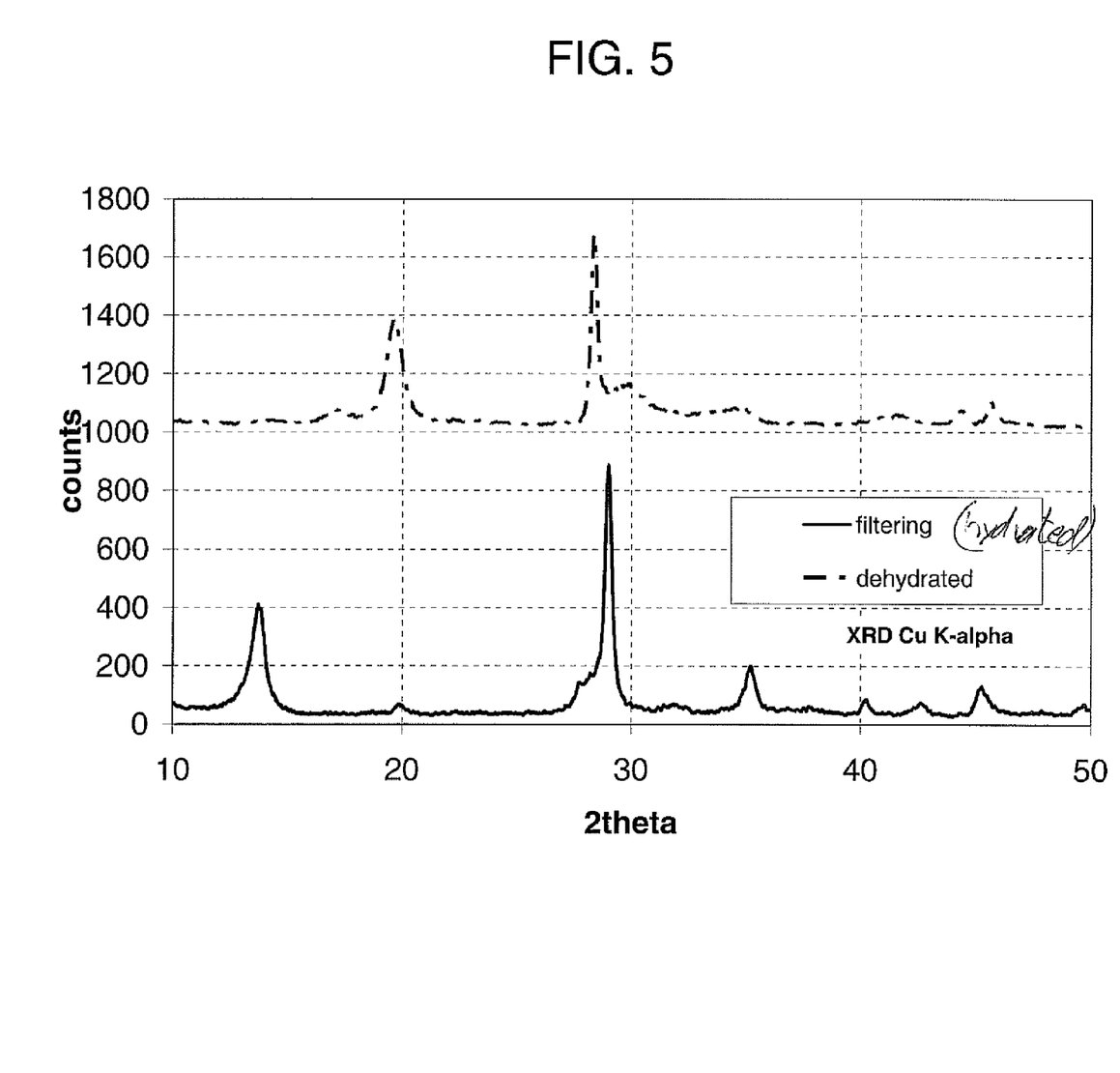
FIG. 5 shows the results of an x-ray powder diffraction analysis of a second sample of $LiVOPO_4$ prepared according to the invention, both before and after dehydration.

Referring to FIG. 5, CuKα (λ=1.5405 Å) powder x-ray diffraction patterns were collected for the as-dried precipitate and the dehydrated material.

Electrodes were formulated from a slurry with a weight ratio of 77:10:13 of active sample:super-p carbon:PVDF binder, which were mixed in a NMP-based slurry. The slurry was cast onto aluminum foil, dried to remove the solvent and cut to form an electrode coupon. A cell was assembled using the coupon as a cathode, lithium metal as the anode, LiPF$_6$ in 2:1 EC:DMC as the electrolyte and glass fiber as the separator.

High-resolution electrochemical measurements were performed using the Electrochemical Voltage Spectroscopy (EVS) technique. EVS is a voltage step method, which provides a high-resolution approximation to the open circuit voltage curve for the electrochemical system under investigation. Such technique is known in the art as described by J. Barker in Synth. Met 28, D217 (1989); Synth. Met. 32, 43 (1989); J. Power Sources, 52, 185 (1994); and Electrochemica Acta, Vol. 40, No. 11, at 1603 (1995).

Figure 6:
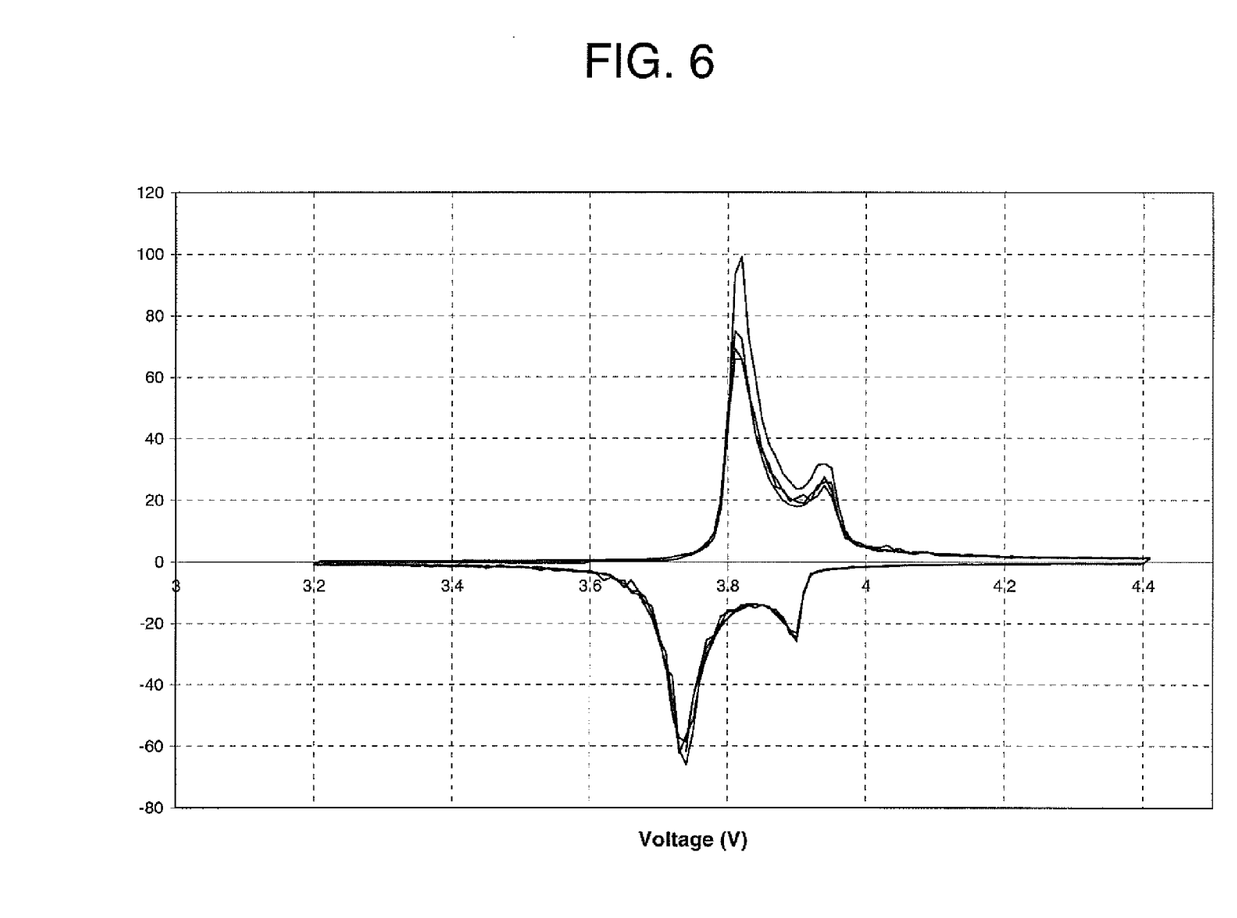
FIG. 6 is an EVS differential capacity plot for a second $Li/1M\ LiPF_6\ (EC/DMC)/LiVOPO_4$ cell.

FIG. 6 shows an EVS scan of the material made by this means. There are two distinct reversible processes, at about 3.9V and 3.75V on discharge. The specific discharge capacity for this cell was calculated to be 112.8 mAh/g.

The examples and other embodiments described herein are exemplary and not intended to be limiting in describing the full scope of compositions and methods of this invention. Equivalent changes, modifications and variations of specific embodiments, materials, compositions and methods may be made within the scope of the present invention, with substantially similar results.

What is claimed is:

1. A method for making a compound represented by the general formula:

$$A_a(VO)_bXO_4,$$

wherein:
(a) A is an alkali metal or mixture of alkali metals and 0<a≦2;
(b) X is selected from the group consisting of phosphorous (P), sulfur (S), arsenic (As), silicon (Si), and combinations thereof; and
(c) A, X, a and b are selected to maintain the electroneutrality of the compound;
the method comprising the steps of:
forming an acidic aqueous solution comprising vanadyl ions, ions of an alkali metal, and ions of XO$_4$;
wherein the step of forming the acidic aqueous solution comprises the step of dissolving one or more vanadyl precursor compound, one or more alkali metal precursor compounds, and one or more precursor compounds containing moiety XO$_4$, in an aqueous solvent, is a step-wise dissolution reaction at standard temperature and pressure; and
precipitating the compound from the acidic aqueous solution.

2. The method of claim 1, wherein the aqueous solution has a pH≦5 at standard temperature and pressure.

3. The method of claim 2, wherein 0≦pH≦4 at standard temperature and pressure.

4. The method of claim 3, wherein 2≦pH≦4.

5. The method of claim 1, wherein the step of dissolving one or more vanadyl precursor compounds, one or more alkali metal precursor compounds, and one or more precursor compounds containing moiety XO$_4$, in an aqueous solvent, further comprises the step of adding an acidic buffer in an amount sufficient to adjust the pH to $\leq 5$.

6. The method of claim 1, wherein A is selected from the group consisting of Li, Na, K, and mixtures thereof.

7. The method of claim 1, wherein A is Li.

8. The method of claim 1, wherein the compound is $LiVOPO_4$.

9. A method for making a compound represented by the general formula:

$$A_a(VO)_bXO_4,$$

wherein:
(a) A is an alkali metal or mixture of alkali metals and $0 < a \leq 2$;
(b) X is selected from the group consisting of phosphorous (P), sulfur (S), arsenic (As), silicon (Si), and combinations thereof; and
(c) A, X, a and b are selected to maintain the electroneutrality of the compound;

the method comprising the steps of:

forming an acidic aqueous solution comprising vanadyl ions, ions of an alkali metal, and ions of $XO_4$;

wherein the step of forming the acidic aqueous solution comprises the step of dissolving one or more vanadyl precursor compound, one or more alkali metal precursor compounds, and one or more precursor compounds containing moiety $XO_4$, in an aqueous solvent, is a step-wise dissolution reaction at standard temperature and pressure; and precipitating the compound from the acidic aqueous solution wherein:
the one or more vanadyl precursor compounds is selected from the group consisting of $V_2O_5$, $V_2O_3$, $VOSO_4$, $VOC_2O_4$, and mixtures thereof; and
the one or more alkali metal precursor compounds and the one or more precursor compounds containing moiety $XO_4$ are the same compound and is selected from the group consisting of $A_2SO_4$, $A_4SiO_4$, $AH_2PO_4$, $A_3PO_4$, $HAsA_2O_4$, and mixtures thereof, wherein A is an alkali metal.

* * * * *

UNITED STATES PATENT AND TRADEMARK OFFICE
CERTIFICATE OF CORRECTION

| | | |
|---|---|---|
| PATENT NO. | : 8,318,353 B2 | Page 1 of 1 |
| APPLICATION NO. | : 12/845869 | |
| DATED | : November 27, 2012 | |
| INVENTOR(S) | : Titus Faulkner | |

It is certified that error appears in the above-identified patent and that said Letters Patent is hereby corrected as shown below:

In the Specifications:

Column 6, Line 37

Delete "50 μm a 2,000 μm"
Insert --50 μm ≤ a ≤ 2,000 μm--

Column 6, Line 41

Delete "50 μm b 2,000 μm"
Insert --50 μm ≤ b ≤ 2,000 μm--

Signed and Sealed this
Third Day of September, 2013

Teresa Stanek Rea
*Acting Director of the United States Patent and Trademark Office*